United States Patent
Askelöf et al.

(10) Patent No.: US 8,260,056 B2
(45) Date of Patent: Sep. 4, 2012

(54) RESIZING VIDEO AND ALIGNING VIDEO IMAGE EDGES TO BLOCK BOUNDARIES AND PICTURE BOUNDARIES

(75) Inventors: Joel Askelöf, Stockholm (SE); Henric Axelsson, Stockholm (SE); Kristofer Dovstam, Kista (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 1234 days.

(21) Appl. No.: 12/064,213

(22) PCT Filed: Aug. 19, 2005

(86) PCT No.: PCT/SE2005/001222
§ 371 (c)(1), (2), (4) Date: Feb. 19, 2008

(87) PCT Pub. No.: WO2007/021225
PCT Pub. Date: Feb. 22, 2007

(65) Prior Publication Data
US 2008/0253690 A1    Oct. 16, 2008

(51) Int. Cl.
*G06K 9/48* (2006.01)
(52) U.S. Cl. ......... 382/199; 382/166; 382/242; 382/239
(58) Field of Classification Search .................. 382/112, 382/118, 164, 173, 190, 284, 294
See application file for complete search history.

(56) References Cited

U.S. PATENT DOCUMENTS

| | | | | |
|---|---|---|---|---|
| 5,611,036 A * | 3/1997 | Berend et al. | | 345/441 |
| 5,732,298 A * | 3/1998 | Nishizawa et al. | | 396/380 |
| 6,151,424 A * | 11/2000 | Hsu | | 382/294 |
| 6,404,920 B1 * | 6/2002 | Hsu | | 382/190 |
| 6,587,583 B1 * | 7/2003 | Kurzweil et al. | | 382/164 |
| 6,766,056 B1 * | 7/2004 | Huang et al. | | 382/190 |
| 7,460,693 B2 * | 12/2008 | Loy et al. | | 382/118 |
| 7,565,028 B2 * | 7/2009 | Saed | | 382/284 |
| 2001/0036296 A1 * | 11/2001 | Young et al. | | 382/112 |
| 2003/0086608 A1 * | 5/2003 | Frost et al. | | 382/173 |
| 2003/0219160 A1 * | 11/2003 | Song et al. | | 382/236 |

* cited by examiner

*Primary Examiner* — Vu Le
*Assistant Examiner* — Aklilu Woldermariam

(57) ABSTRACT

The invention teaches a method of positioning a first image having a first image format into a second image comprising multiple image blocks and having a second image format. A straight boundary of at least one image block in the second image is identified. The first image is positioned into the second image by aligning an edge of the first image with the identified straight boundary. Alternatively, a block row or column of the first image can be aligned with the straight boundary but then in such a way that an edge of the first image parallel to the block row or column is aligned with a boundary of a row or column of image blocks in the second image. This image positioning reduces any bleeding artifacts and the number of bits required for representing the image during encoding.

18 Claims, 11 Drawing Sheets

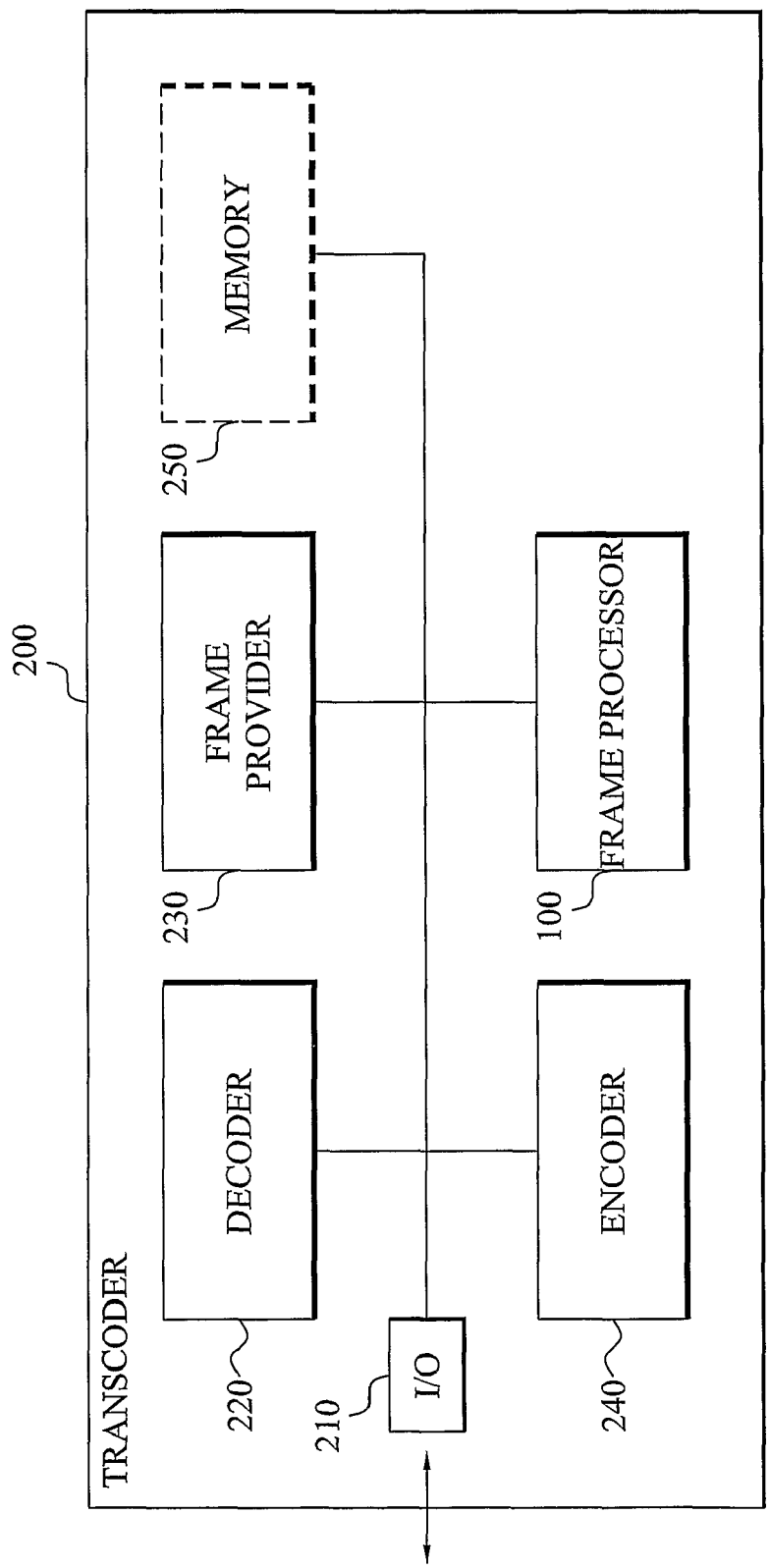

RESIZING VIDEO AND ALIGNING VIDEO IMAGE EDGES TO BLOCK BOUNDARIES AND PICTURE BOUNDARIES

TECHNICAL FIELD

The present invention generally relates to image management, and in particular to image frame management that involves positioning a first image frame having a first image format into a second image frame having a second different image format.

BACKGROUND

Presentation and rendering of images, graphics and video on data processing systems and user terminals, such as computers, and in particular on mobile terminals have increased tremendously the last years. This increase in image rendering and utilization of vastly different data processing and presenting systems and terminals often requires resizing images between different image formats adapted for different presenting systems and terminals.

When images, e.g. images in a video sequence, are resized and the new image dimension has a new width and height ratio, borders are typically positioned above and below and/or to the left and right of the resized image. Such a resizing is employed e.g. in widescreen format adaptation. This border positioning is particularly common in scenarios where the resizing is time-critical and the computational complexity needs to be low, such as when transcoding real-time media and/or when the transcoding/resizing is performed by mobile terminals and other thin clients.

FIG. 1 illustrates such a prior technique employed in resizing images. In this figure an original, possibly resized, image or image frame 10 is positioned within a new image frame 30 having a different width and height ratio compared to the original image frame 10. According to the prior art techniques, the (resized) original image frame 10 is placed as symmetrical as possible within the new image frame 30 so that the actual visible image 10 is placed in the middle of the new frame 30. Note further the borders that are found to the left and right of the original image frame 10.

Rendering of images is a computationally expensive task in terms of memory bandwidth and processing power required for the graphic systems. For example, images are costly both in terms of memory, the images must be placed on fast on-chip memory, and in terms of memory bandwidth, an image can be accessed several times to draw a single pixel.

In order to reduce the bandwidth and processing power requirements, an image compressing or encoding method or system is typically employed. Such an encoding system should result in more efficient usage of expensive on-chip memory and lower memory bandwidth during rendering and, thus, in lower power consumption and/or faster rendering.

When compressing an image, sharp edges generally require more bits than smooth edges to be represented with a similar quality. Another characteristic of image compressions is the artifact known as bleeding. This bleeding phenomenon implies that colors tend to smear. Bleeding becomes more prominent when a colorful region is located adjacent to a region with less color, or only one color.

SUMMARY

When positioning an original, possibly resized, image frame in a new image frame, borders will be found outside of the original image frame. These borders are often one-colored (typically black) and often result in sharp edges along the actual image. As a consequence more bits are required to represent these sharp edges, resulting in a lower compression rate and that more bits have to be used for encoding the image. In addition, the bleeding artifact will typically become prominent in the sides of the borders facing the original image frame. This bleeding results in that the less colored region, typically the borders, will show traces of the colors included in the colorful region, typically the original image frame (and also vice versa).

The present invention overcomes these and other drawbacks of the prior art arrangements.

It is a general object of the present invention to provide a processing of images between different image formats.

It is another object of the invention to provide a positioning of a smaller image into a larger image.

Yet another object of the invention is to provide an image processing that reduces the bleeding artifact.

A further object of the invention is to provide an image processing that enables encoding the processed image with a reduced number of bits.

These and other objects are met by the invention as defined by the accompanying patent claims.

Briefly, the present invention involves an image processing in which a first image or image frame having a first image format is positioned into a second image or image frame comprising multiple image blocks and having a second different image format.

According to the invention, a straight boundary of at least one image block is identified in the second image frame. This straight boundary can be a boundary of a row or column of image blocks, or a portion thereof. The straight boundary can be an image edge, i.e. an outermost block boundary in the second image frame but is preferably an inner block boundary. In a first embodiment of the invention, a first edge of the first image frame is aligned with the identified straight boundary to so position the first image frame into the second image frame. This edge and block boundary alignment implies that the image edge of the first image coincidence with a (row or column) block boundary of the second image. As a consequence, when compressing or encoding the resulting second image frame with the first image frame positioned therein, no bleeding will occur at the first edge due to this edge and boundary alignment. In addition, a sharp edge that coincidence with a block boundary can be encoded with fewer bits at a given quality compared to a corresponding edge not aligned with a block boundary. Thus, the invention reduces the bleeding artifact and reduces the number of bits required for image encoding.

In a second embodiment, also the first image frame is regarded as composed of multiple image blocks. These blocks can be of the same or different size as the corresponding blocks of the second image. In this embodiment, a boundary of a row or column of image blocks in the first image frame is aligned with the identified straight boundary. In addition, this row or column boundary is selected so that a first edge of the first image frame parallel to the row or column boundary becomes aligned with a boundary of a row or column of image blocks in the second image frame. Thus, also in this embodiment, the first image edge is aligned with a block boundary. As a consequence, this embodiment has all the advantages of the first embodiment.

The alignment is further preferably performed so that a second and third edge of the first image becomes aligned with a second and third edge of the second image frame, respectively. In such a case, at least three edges of the first image frame are aligned with block or image boundaries, which reduces the bleeding phenomenon further.

The first image frame can optionally be resized before being positioned into the second image frame, preferably while keeping the aspect ratio of the image.

If cropping of the first image frame is to be performed, the first image is preferably temporarily positioned into the second image frame as described above. A surplus portion of the first image not being aligned with and extending beyond a row or column block boundary in the second image frame is then identified. The size of this surplus portion can optionally be compared to a threshold, in order to determine whether cropping is allowed, i.e. size<threshold, or not, i.e. size≧threshold. If cropping is to be performed, the surplus portion can be removed from the first image frame. Preferably, a symmetric cropping is instead employed by removing, from a first image side, a portion of the first image frame that corresponds to about half the surplus portion. A corresponding portion is then also removed from a second opposite side of the first image frame. The so-cropped first image frame is re-positioned into the second image frame according to the present invention. In this case all four edges of the first image can be aligned with block and image boundaries. As a consequence, no bleeding will occur and the number of required coding bits is minimized.

The positioning of the invention can advantageously be employed in connection with image transcoding between different image formats, e.g. during a widescreen format adaptation.

The invention offers the following advantages:
Provides an effective positioning of images into image frames having another image format;
Reduces the bleeding phenomenon during image encoding;
Reduces the number of bits required for representing edges of the positioned image during image encoding;
Can be applied to different image processing techniques and transcoders; and
Enables image transcoding in thin clients with limited image processing and storage capacity.

Other advantages offered by the present invention will be appreciated upon reading of the below description of the embodiments of the invention.

SHORT DESCRIPTION OF THE DRAWINGS

The invention together with further objects and advantages thereof, may best be understood by making reference to the following description taken together with the accompanying drawings, in which:

FIG. 1 illustrates positioning an original image frame into a new image frame according to the prior art techniques;

FIG. 2A schematically illustrates an image frame having a first image format;

FIG. 2B schematically illustrates an image frame of multiple image blocks having a second image format;

Figure 4:
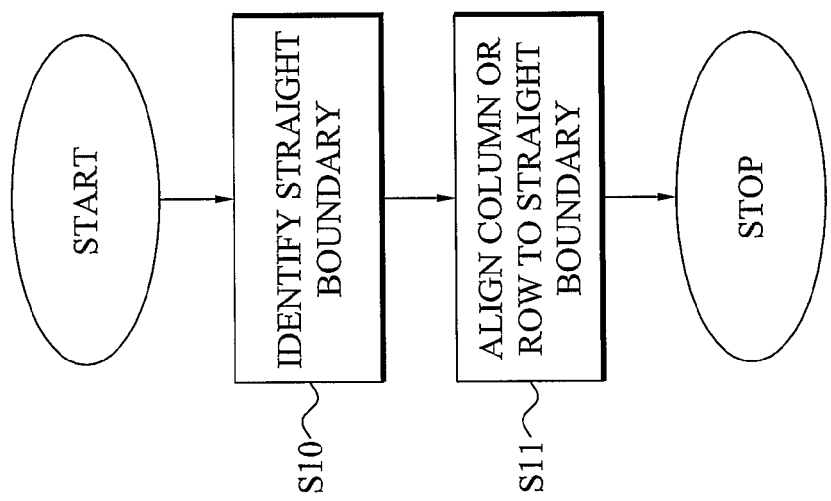
FIG. 4 is a flow diagram of a method of positioning an original image frame of multiple image blocks into a new image frame of multiple image blocks according to another embodiment of the present invention.
Figure 3:
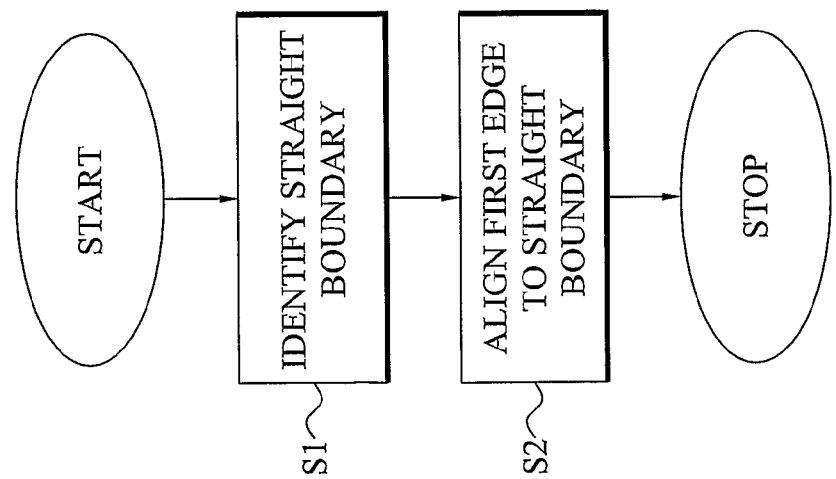
FIG. 3 is a flow diagram of a method of positioning an original image frame into a new image frame of multiple image blocks according to an embodiment of the present invention.
Figure 6A:
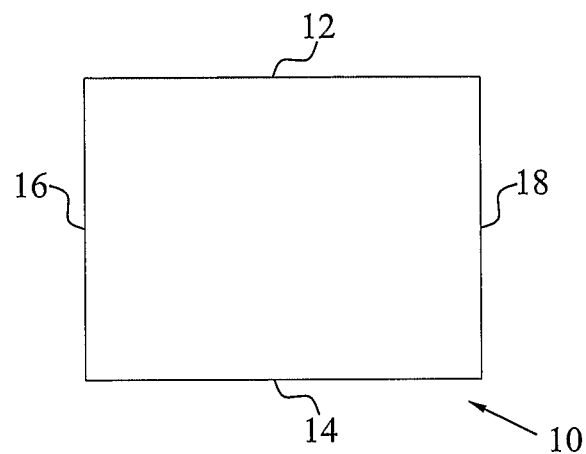
Figure 6B:
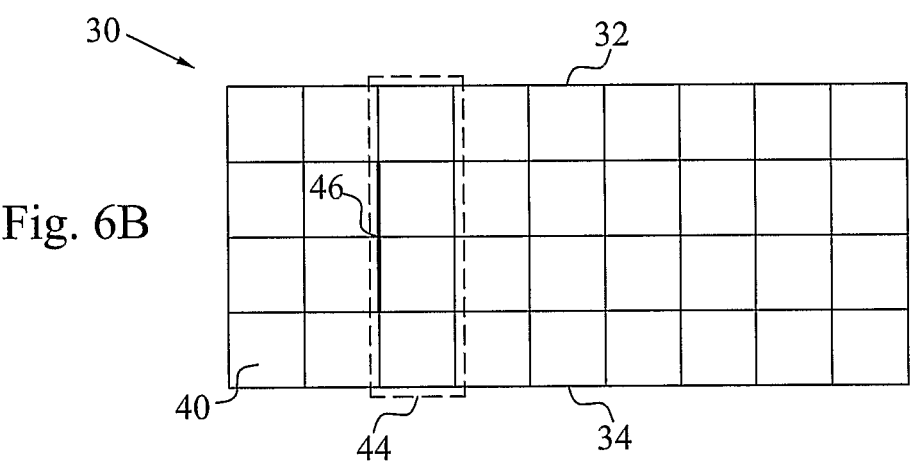
Figure 6C:
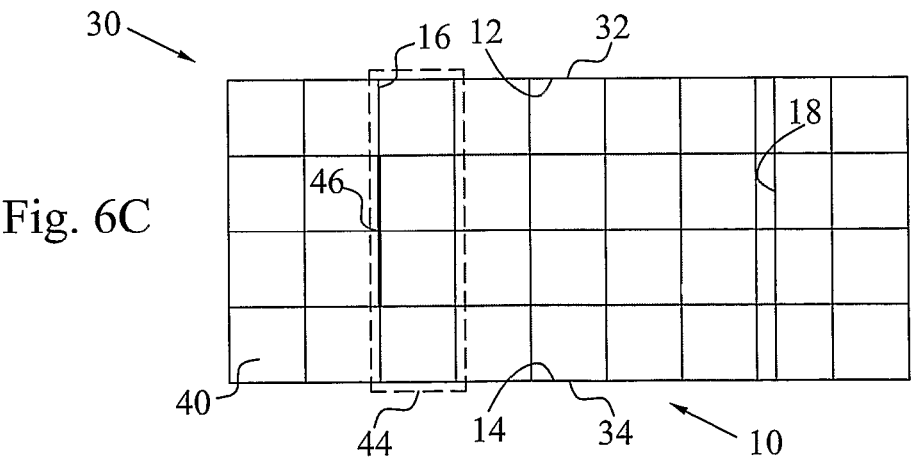
Figure 7:
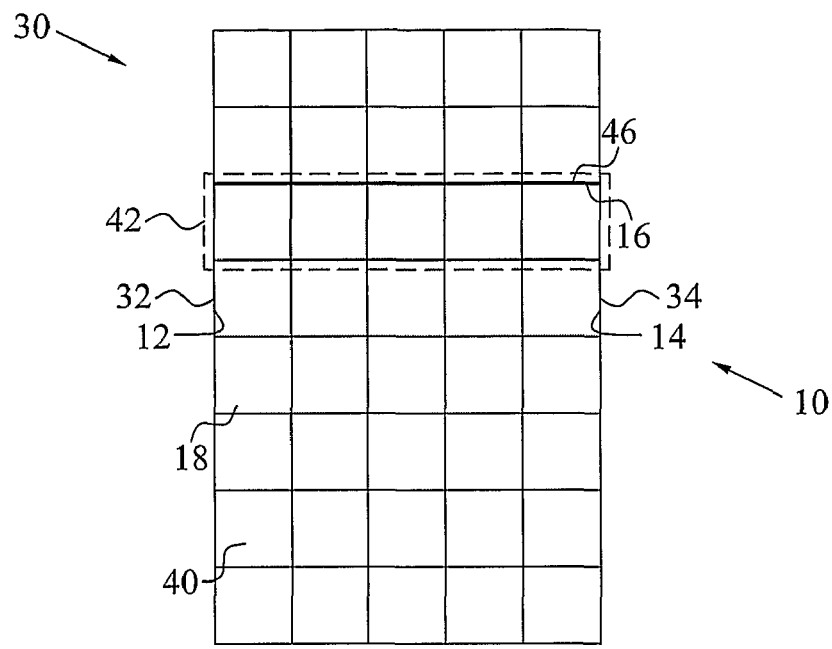
Figure 8:
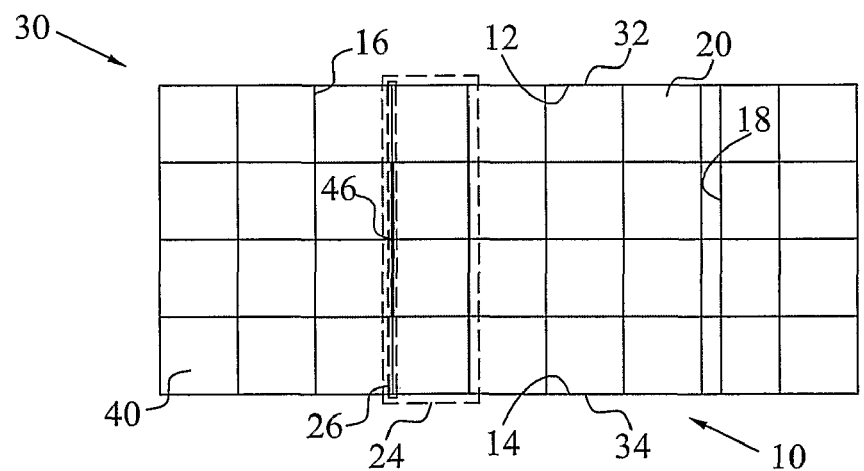
Figure 12:
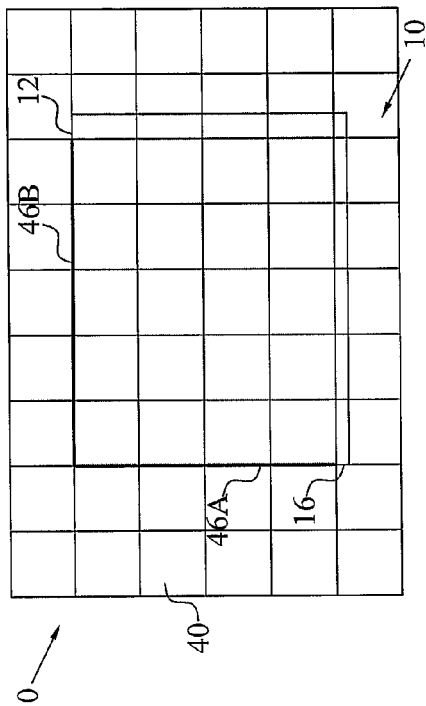
Figure 10:
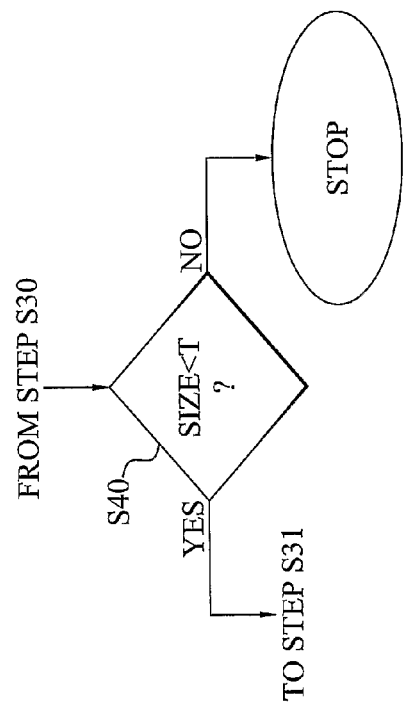
Figure 9:
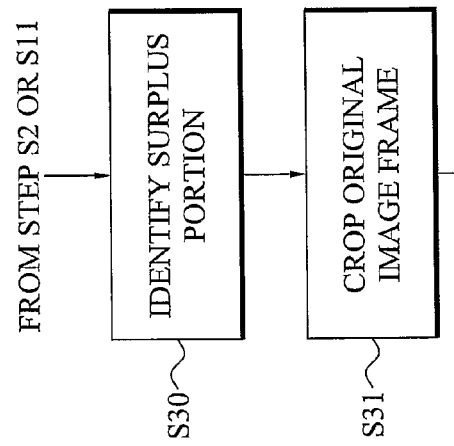
Figure 11A:
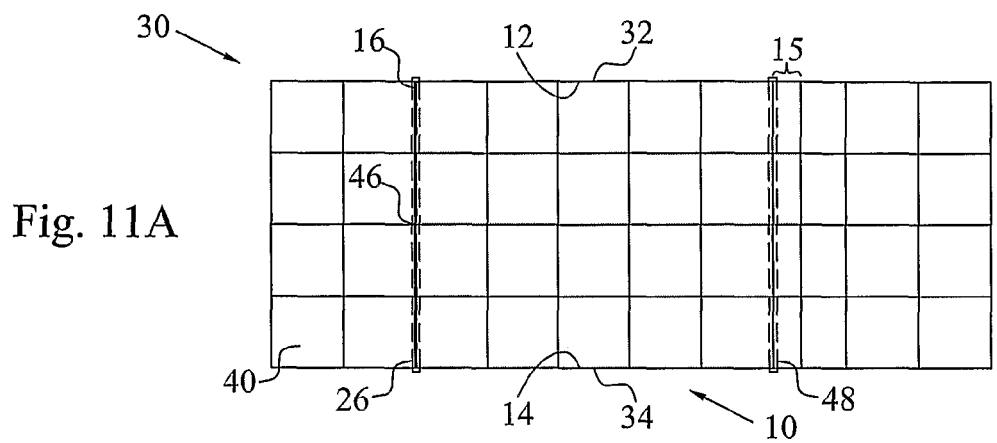
Figure 11B:
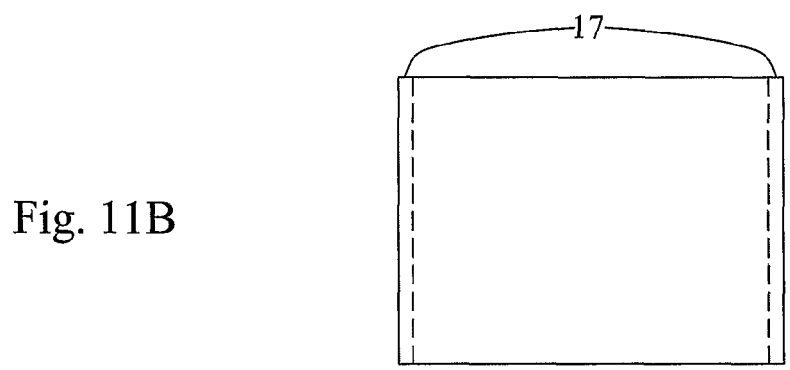
Figure 11C:
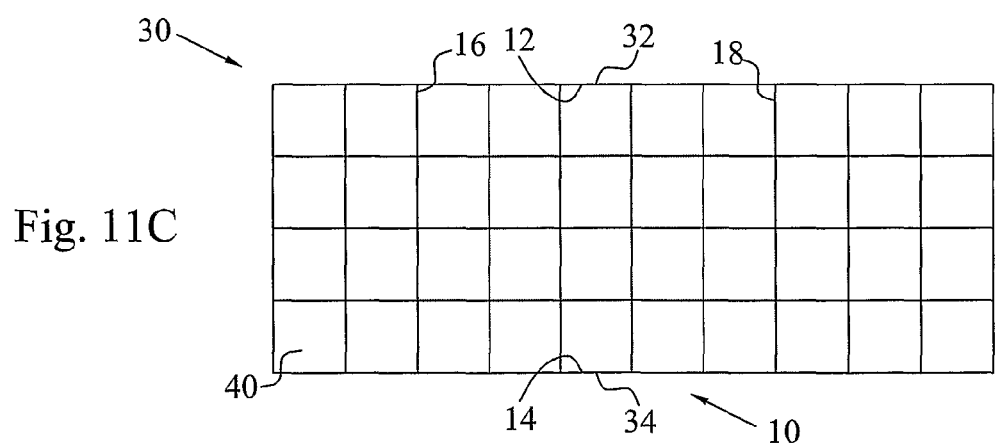
Figure 13:
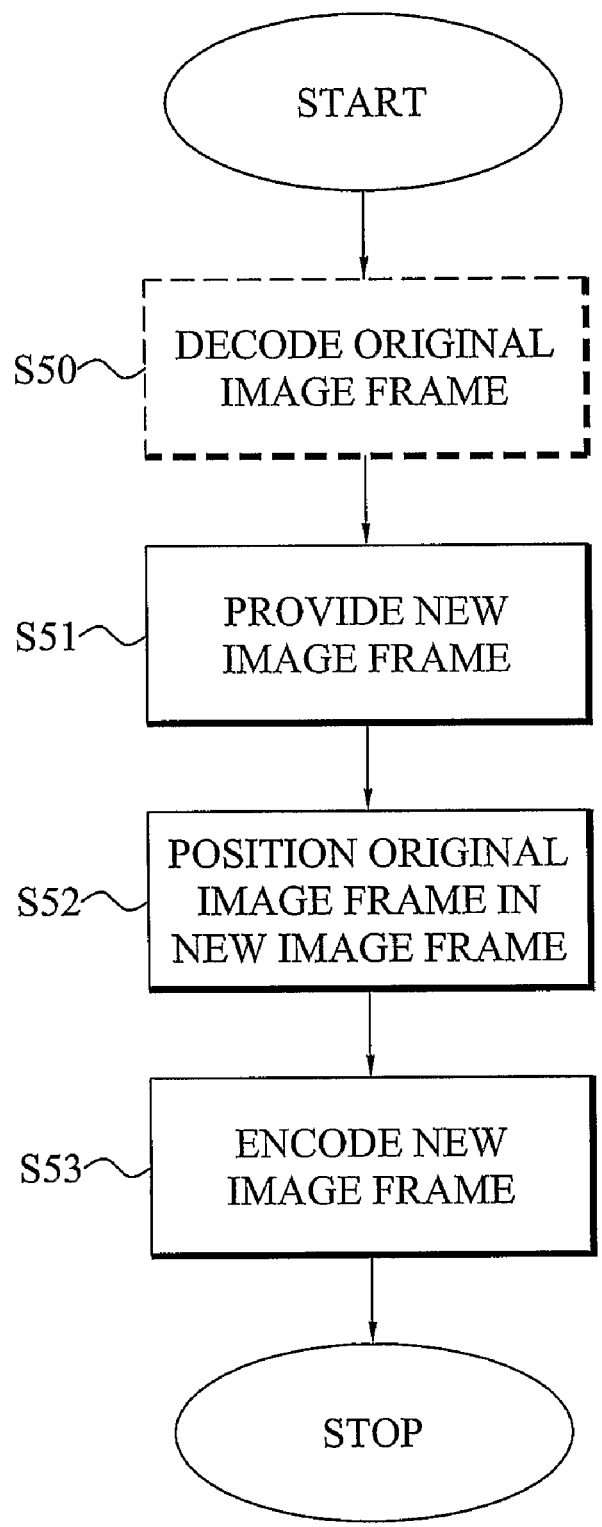
Figure 14:
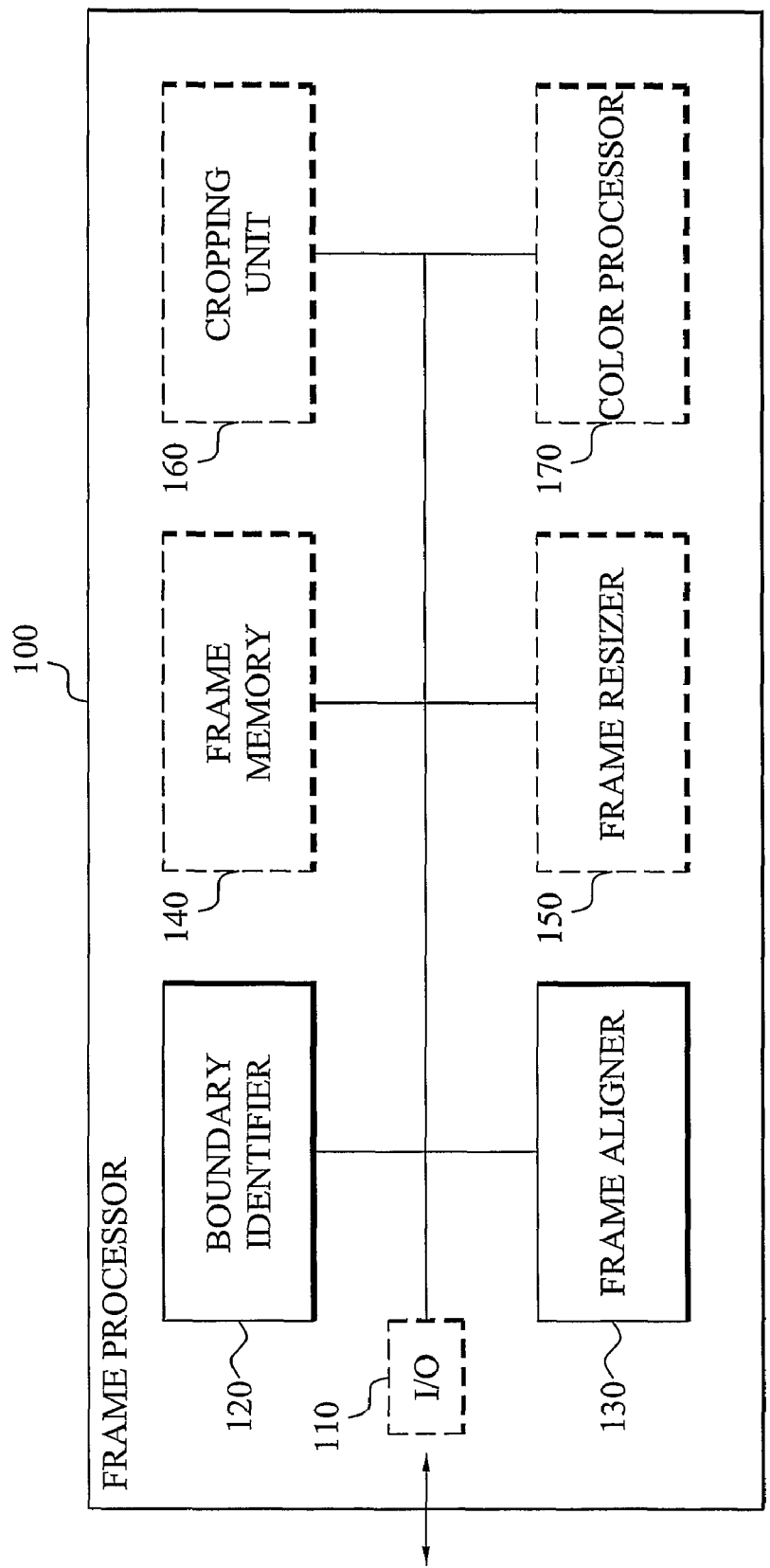
Figure 16:
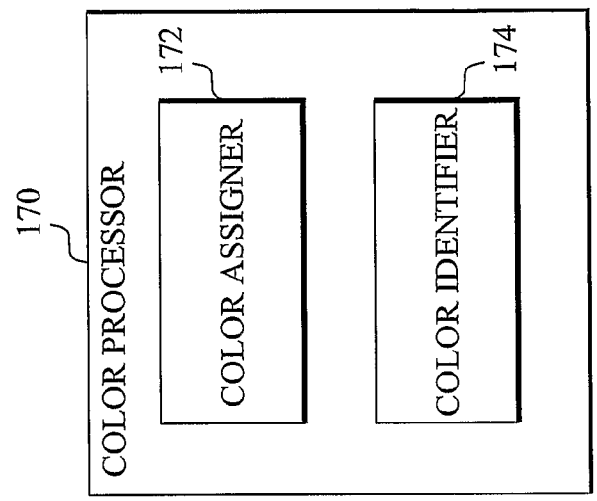
Figure 15:
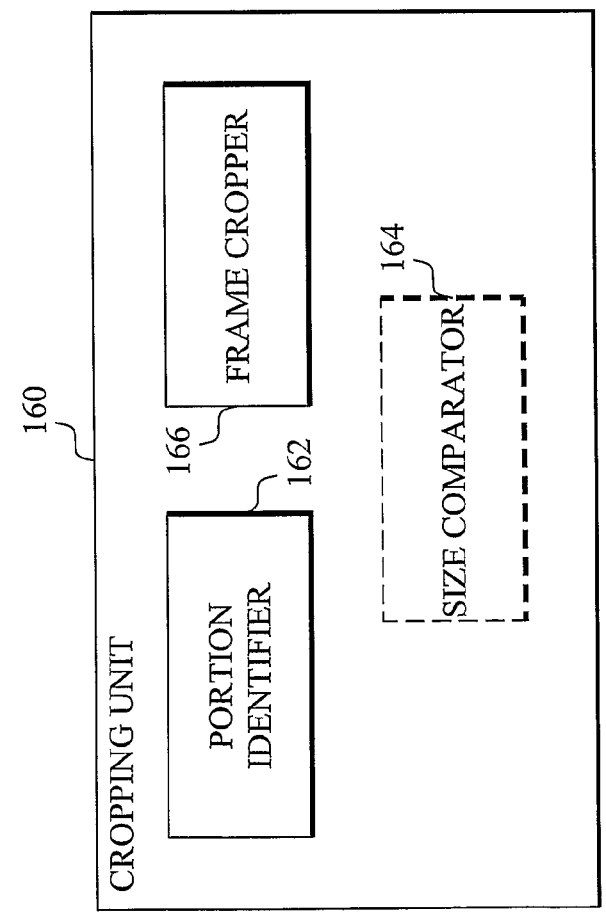
Figure 18:
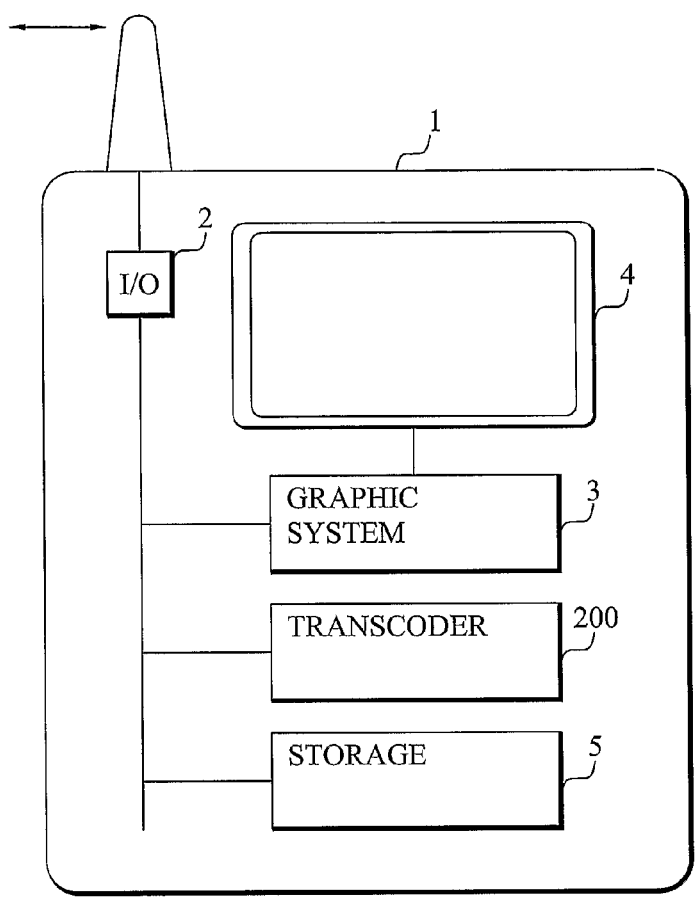
Figure 19:
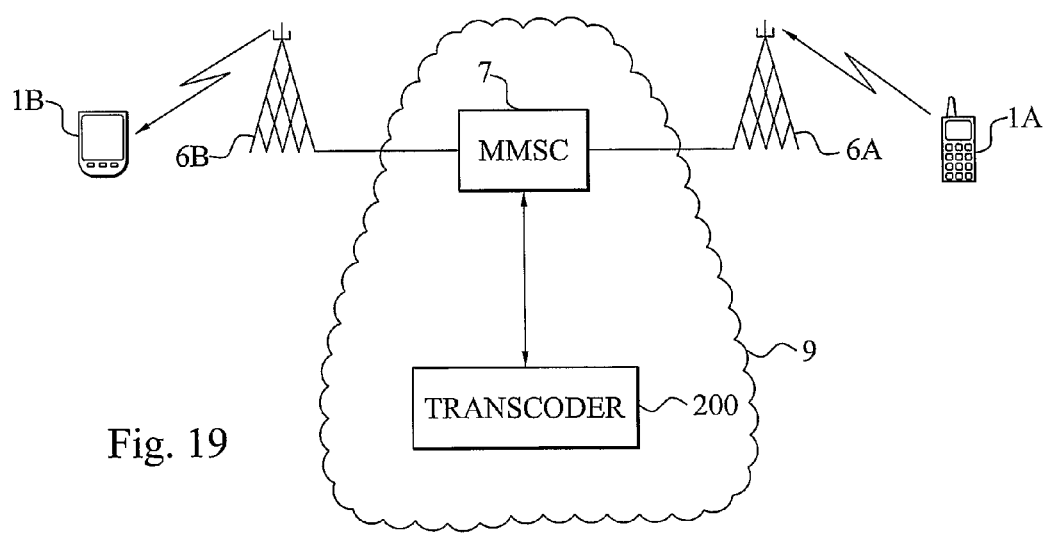

FIG. 6A schematically illustrates an embodiment of an original image frame to be positioned within a new image frame according to the present invention;

FIG. 6B schematically illustrates an embodiment of a new image frame into which an original image frame is to be positioned according to the present invention;

FIG. 6C schematically illustrates the original image frame of FIG. 6A positioned in the new image frame of FIG. 6B according to the present invention;

FIG. 7 schematically illustrates another embodiment of an original image frame positioned within a new image frame according to the present invention;

FIG. 8 schematically illustrates a further embodiment of an original image frame positioned within a new image frame according to the present invention;

FIG. 9 is a flow diagram illustrating additional steps of the positioning method of FIGS. 3 and 4;

FIG. 10 is a flow diagram illustrating an additional step of the positioning method of FIG. 9;

FIG. 11A schematically illustrates yet another embodiment of an original image frame positioned within a new image frame according to the present invention;

FIG. 11B schematically illustrates cropping surplus portions of an original image frame according to an embodiment of the present invention;

FIG. 11C schematically illustrates positioning the cropped original image frame of FIG. 11B into a new image frame according to the present invention;

FIG. 12 schematically illustrates still another embodiment of an original image frame positioned within a new image frame according to the present invention;

FIG. 13 is a flow diagram illustrating a transcoding method according to an embodiment of the present invention;

FIG. 14 is a block diagram schematically illustrating an embodiment of a frame processor according to the present invention;

FIG. 15 is a block diagram schematically illustrating an embodiment of the cropping unit of FIG. 14 in more detail;

FIG. 16 is a block diagram schematically illustrating an embodiment of the color processor of FIG. 14 in more detail;

FIG. 17 is a block diagram schematically illustrating an embodiment of a transcoder according to the present invention;

FIG. 18 schematically illustrates an embodiment of a user terminal with a transcoder according to the present invention; and FIG. 19 is a schematic overview of a wireless communications system having a network-implemented transcoder according to the present invention.

DETAILED DESCRIPTION

Throughout the drawings, the same reference characters will be used for corresponding or similar elements.

The present invention generally refers to image and image frame processing, and in particular to positioning an image frame having a given image size or format into another image frame having another image size or format. The teachings of the present invention can advantageously be employed when resizing image frames and transcoding such image frames, but is not limited thereto.

In the present invention the expression "image frame" is used to denote any 2D or 3D image, texture or graphics, including but not limited to video images, photos, game type textures, text, drawings, etc. An "image element" refers to an element in image or encoded image representation. Thus, according to the invention, an image element could be a texel (texture element) of a (2D or 3D) texture, a pixel of a (2D or 3D) image or a voxel of a 3D image. Generally, an image element is characterized by certain image-element properties, such as a color value. An image frame can generally be regarded as divided into or composed of multiple image blocks. This image block, in turn, comprises multiple image elements.

Figure 2A:
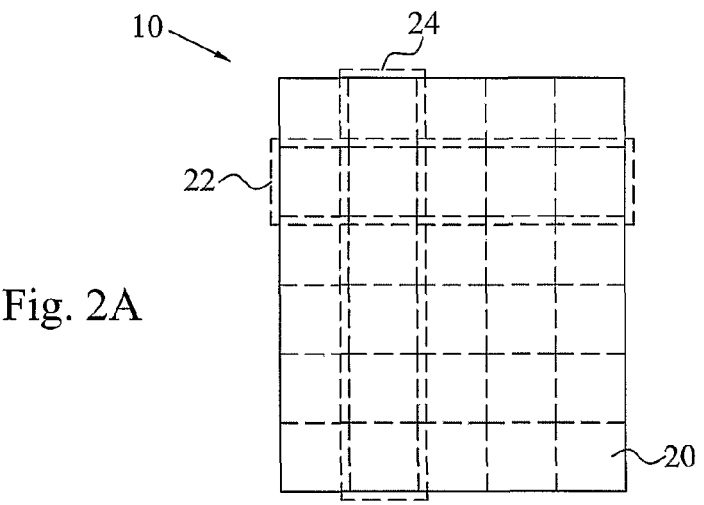
Figure 2B:
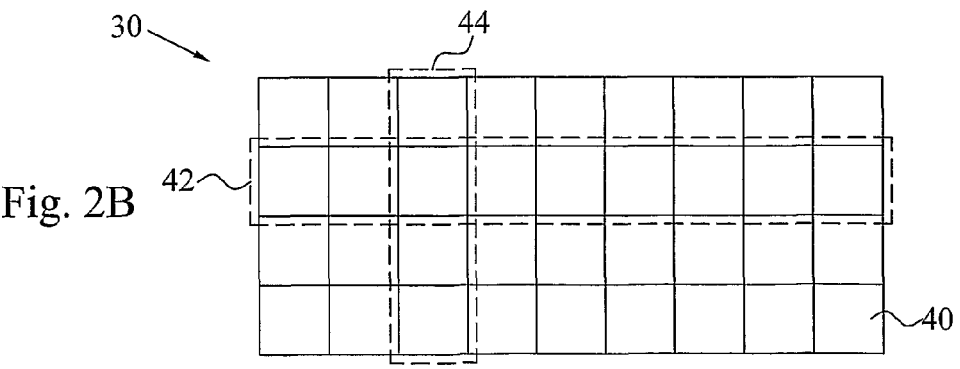

FIG. 2A schematically illustrates an image or image frame 10 that is to be resized and positioned within a new image frame 30 of FIG. 2B having a different image format. The image frame 10 could be regarded as composed or divided into multiple image or macro blocks 20 having a defined number of multiple image elements. Such an image block 20 could e.g. be of a size $2^m \times 2^n$ or $2^m \times 2^n \times 2^p$, where m, n and p independently is zero or a positive integer. This means that the image frame 10 could be viewed as an array or grid of image blocks 20 organized into rows 22 and columns 24, of which only one is illustrated in the figure. An image frame has a defined aspect ratio, e.g. 6:5 as illustrated in FIG. 2A.

The image frame 30 of FIG. 2B is likewise composed of or divided into multiple image blocks 40, each having multiple image elements. The image blocks 40 are organized into rows 42 and columns 44, of which only one is illustrated in the figure. This image frame 30 has another aspect ratio of 4:9.

In the following, the expression "original image frame" is used to denote the image or image frame that is to be positioned within another image frame. Correspondingly, "new image frame" denotes the image or image frame into which the original image frame is positioned.

According to the prior art techniques, the original image frame 10 of FIG. 2A is resized will keeping the aspect ratio (6:5) so that it fits into the new image frame 30 of FIG. 2B. The result of this prior art image frame positioning is found in FIG. 1. Thus, the typical scenario is that the frame size of an image 10 is to be reduced to fit a new screen while keeping the original aspect ratio. For example, a frame size of 96×80 image elements should be fit into a new frame size of 144×60 image elements. Resizing the original image frame 10 results in a size of 72×60 image elements (same aspect ratio as 96×80). According to the prior art, this reduced image 10 is then centered as symmetrical as possible in the new image frame 30, resulting in that borders of the new image frame 30 will be present on the left and right hand side of the original image frame 10. In this prior art positioning, two of the edges of the original image frame 10 will extend partly into two columns 44 of image blocks in the new image frame. This extension of the original image frame 10 partly into image block columns 44 (or rows) of the new image frame 30 causes bleeding at both the edges between the new 30 and original 10 image frame. In addition, the sharp edges between the original 10 and new 30 image frames require a relatively high number of bits for representing the edges at adequate quality.

However, the bleeding phenomenon described above and present in the prior art solutions does not occur over block boundaries. As a consequence, according to the present invention, the original image frame is positioned into the new image frame so that an edge or side of the original image frame will become aligned with a block boundary of the new image frame. This reduces or completely removes the bleeding phenomenon and furthermore reduces the number of bits needed to compress the resulting image because sharp edges that coincide with block boundaries can be coded with fewer bits than sharp edges that do not.

FIG. 3 is a flow diagram of a method of positioning an original image frame into a new image frame according to an embodiment of the present invention. This image positioning can e.g. be performed during a transcoding operation, where the original image frame is adapted to a new image format, e.g. widescreen format adaptation.

The method starts in step S1, where a straight boundary of at least one image block in the new image frame is identified. This straight boundary can be the boundary of a row or column of image blocks in the new image frame. Alternatively, the straight boundary is a portion of such a block row or column. For example, if a row (or column) of the new image frame consists of four image blocks, the straight boundary could be any boundary of one, two, three or four blocks of these four image blocks. The straight boundary could also be the image boundary or edge of the new image frame, or a portion thereof. Thus, in this particular case, the straight boundary will be a boundary of an outermost row or column in the new image frame, or a portion of the outermost block row or column.

In a next step S2, a first edge of the original image frame is aligned with the identified straight boundary. This means that the original image frame will be positioned in the new image frame so that the first edge coincidence with a block boundary (possible the outermost block boundary or image boundary) of the new image frame. The method then ends.

FIG. 6A schematically illustrates an original image frame 10 to be positioned into a new image frame according to the present invention. The image frame 10 comprises a first 16, a second 12, a third 14 and a fourth 18 edge or side. FIG. 6B schematically illustrates the new image frame 30, into which the original image frame 10 of FIG. 6A is to be positioned. In this frame positioning, a straight boundary 46 of at least one image block 40 of the new image frame 30 is first identified. In this figure, the straight boundary 46 is a boundary of two image blocks 40 in a block column 44. With reference to FIGS. 6A-6C, the first edge 16 of the original image frame 10 is then aligned with this straight boundary 46. This means that this edge 16 or side of the original image frame 10 ends precisely at the boundary between two block columns 44 in the new image frame 30. Thus, no bleeding will take place at this image side. Furthermore, due to a possible resizing of the original image frame 10, the second edge 12 of the original image frame 10 is aligned with a second edge 32 of the new image frame 30. Correspondingly, the third opposite edge 14 of the original image 10 is aligned with a third opposite edge 34 of the new image frame 30. This means that when employing resizing of the original image frame 10 at least three edges 12, 14, 16 of the original image frame will be aligned with block 46 or image 32, 34 edges of the new image frame 30. This should be compared to the prior art situation in FIG. 1, where the original image frame edges most often coincidence with only two image edges of the new image frame.

Figure 1:
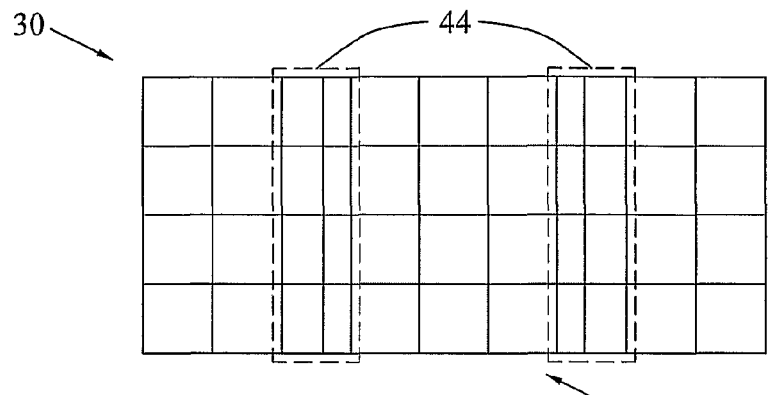

In this example the fourth and remaining edge 18 of the original image frame 10 is not aligned with any image or block boundary. Even though no alignment is possible at all four edges 12, 14, 16, 18 in this example, the bleeding artifact is much reduced and less bits have to be employed for edge image element encoding compared to the prior art (FIG. 1).

If no resizing of the original image frame 10 is performed, at least two edges of the image can be aligned with block or image edges of the new image frame when employing the present invention. This should be compared to prior art techniques that does not apply any active block boundary and edge alignment, but a simple centring, resulting in bleeding in up to all four edges of the original image frame, depending on the size relation between the two images.

In a preferred embodiment, the straight boundary 46 is identified in the new image frame 30 so that the original image frame becomes centered and positioned as symmetrical as possible after the alignment in the new image 30. Thus, any remaining surplus portions (borders) of the new image frame 30 are preferably found above/below and/or to the right/left of the original image frame 10. In this preferred embodiment, the straight boundary 46 is not an image boundary or outermost (row/column) block boundary of the new image frame 30.

As was discussed in the background section, the image elements of the new image frame 30 found outside of the original image frame 10 after positioning, i.e. the image elements in the borders, are typically assigned one and the same color representation, e.g. black or some other one-color representation.

In order to minimize the bleeding phenomenon at the non-aligned side 18 of the original image frame 10, the colors of the image elements close to the sides 16, 18 of the frame 10 are investigated and compared to the color representation of the border image elements. The side 18 having image elements with color representations being closest to the color representations of the image elements in the border is identified. The edge 16 of the original image frame 10 opposite to this identified side 18 is then aligned with the straight boundary 46. This means that the side 18 with image elements having color representations closest to the border color will not be aligned but protrude into a column or row of image blocks in the new image frame 30. As this side 18 is most similar, from color point of view, with the border, the bleeding phenomenon is minimized compared to aligning with this side 18 with the straight boundary 46.

FIG. 7 illustrates another example of image positioning according to the invention. In this figure the identified straight boundary 46 is a complete boundary of a row 42 in the new image frame 30. A first edge 16 of the original frame 10 is aligned with this straight row boundary 46. Also in this example, two more edges 12, 14 of the original image 10 are aligned with image edges 32, 34 of the new image frame 30. Depending on the size of the original image frame 10 it could also be possible that the fourth and remaining edge 18 of the image 10 becomes aligned with a block or image boundary, as illustrated in the figure. This means that then there will be no bleeding at all and the number of bits required for representing the image edges 12, 14, 16, 18 at encoding is markedly reduced.

In the foregoing the original image frame has been regarded as one frame of image elements, whereas the new image frame is composed of or divided into multiple image blocks having image elements. In an alternative implementation, also the original image frame could be regarded as composed of or divided into multiple image blocks having image elements, as illustrated in FIG. 2A. In such a case, the size of the image blocks of the new and original image could be equal or different block sizes could be employed, e.g. 4×4 image elements versus 8×8 image elements.

FIG. 4 illustrates a method of positioning an original image frame of multiple image blocks into a new image frame of multiple image blocks according to another embodiment of the present invention. The method starts in step S10, where a straight boundary of at least one image block is identified in the new image frame. This step S10 corresponds to step S1 in FIG. 3 and is not further discussed. A next step S11 aligns a boundary of a row or column of image blocks in the original image frame with the identified straight boundary. This alignment is performed so that a first edge of the original image frame parallel with the row/column boundary is aligned with a row/column boundary of image blocks in the new image frame. Thus, the row or column boundary of the original image frame to align with the straight boundary is selected so that also the first image edge becomes aligned with a row or column boundary in the new image frame.

If the block sizes are equal in the two image frames, aligning any inner (i.e. not an image boundary) row/column boundary in the original image frame with the straight boundary of the new image frame implies that the first edge of the original image will automatically be aligned with a row/column boundary in the new image frame. As a consequence, the bleeding artifact is reduced or completely suppressed and the number of encoding bits for the image can be reduced.

If different block sizes are used another situation arises. If an image block in the new image frame includes $r_n \times c_n$ image elements, the distance in number of image elements between the first edge and a column boundary to align with the straight boundary has to be $k \times c_n$, where k=1, 2, 3, . . . . In such a case, an image block of the original image frame has to consist of $k \times c_n/c_o$ image elements in a row, where $c_o$=1, 2, 3 . . . . Correspondingly, the distance in number of image elements between the first edge and a row boundary to align with the straight boundary has to be $k \times r_n$, where k=1, 2, 3, . . . . In such a case, an image block of the original image frame has to consist of $k \times r_n/r_o$ image elements in a column, where $r_o$=1, 2, 3 . . . . If this cannot be realized, the original image frame should be positioned into the new image frame according to the method described above in connection with FIG. 3.

FIG. 8 schematically illustrates the principles of positioning an original image frame 10 in a new image frame 30 according to the method disclosed in FIG. 4. In this figure, the two image frames 10, 30 have image blocks 20, 40 of equal size. A boundary 26 of a block column 24 (or a row) in the original image frame 10 is aligned with the identified straight boundary 46. This alignment is further performed so that a first edge 16 of the original image frame 10 (parallel with the block column boundary 26) coincidence with the boundary between two block columns in the new image frame 30. In addition, as in FIG. 6C, the perpendicular edges 12, 14 of the original frame 10 are aligned with block boundaries 32, 34 of the new image frame 30.

Figure 5:
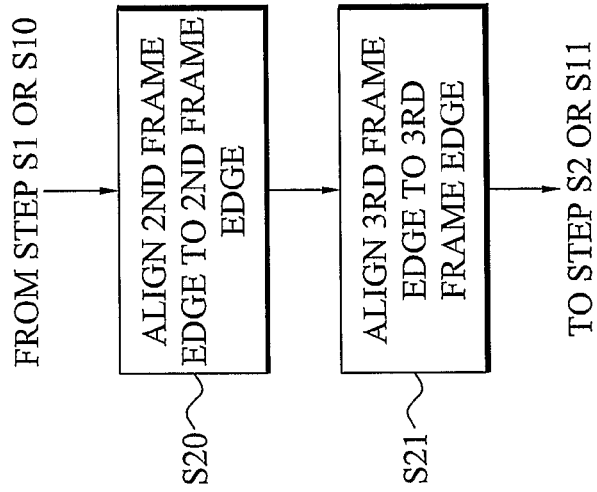
FIG. 5 is a flow diagram illustrating additional steps of the positioning method of FIGS. 3 and 4.

FIG. 5 is a flow diagram of additional steps of the positioning method of FIGS. 3 and 4. The method continues from step S1 of FIG. 3 or step S10 of FIG. 4. In a next step S20, a second edge of the original image frame is aligned with a second edge of the new image frame. In step S21, a third opposite edge of the original image is aligned with a corresponding third opposite edge of the new image. The method then continues to step S2 of FIG. 3 or step S11 of FIG. 4.

Applying the procedure of FIG. 5 in addition to FIG. 3 or 4 implies that at least three edges of the original image frame become aligned with block boundaries (inner block and outer block/image boundaries) of the new image frame.

In some applications, the original image frame is positioned into the new image frame without any preceding frame processing of the original image frame. However, in other applications, the original image frame can be cropped or cut prior the final positioning so that all edges of the original image becomes aligned and coincidence with block boundaries (including image boundaries) in the new image frame. This procedure is schematically illustrated by the flow diagram of FIG. 9. The original image frame is preferably, but not necessarily, first temporarily positioned into the new image frame according to the method described above in connection with FIG. 3 or 4. In a next step S30, a surplus portion of the original image frame not being aligned with and extending beyond a column or row boundary of image blocks in the new image frame is identified.

With reference to FIG. 11A, an original image frame 10 is positioned into a new image frame 30 by identifying a straight boundary 46 of at least one image block 40 in the new image 30. An edge 16 of the original image frame 20 is then aligned with this straight boundary 46 (or, alternatively a column boundary of the original image frame is aligned with the straight boundary). In this illustrative example, this alignment results in that three edges 12, 14, 16 of the original image 10 are aligned with block boundaries 32, 34, 46 of the new image 30. However, for the remaining image side, a portion 15 of the original image frame 10 extends beyond a column boundary 48 of the new image frame 30. Thus, a portion 15 of the image elements in this block column could be regarded as belonging to the original image frame 10, whereas the remaining image elements are regarded as belonging to the new image frame 30. In other words, this surplus portion 15 covers a block boundary 48 in the new image frame 30 but does not reach up to the next parallel block boundary.

Returning to FIG. 9, where a next step S31 crops or cuts the original image frame to adapt the size of the original image to fit into and be aligned with block boundaries in the new image. This cropping could simply be performed by removing the surplus portion (denoted 15 in FIG. 11A) identified in step S30. In a preferred implementation, image elements are removed as symmetrical as possible from the original image frame as is further illustrated in FIG. 11B. For example, if the surplus portion 15 of FIG. 11A comprises m×6 image elements, preferably m×3 image elements 17 are removed or cropped to the left hand side and the right hand side of the original image frame as is schematically illustrated in FIG. 11B. This means that image data will be removed (as equal as possible) from two opposite side of the original image 10. Once the original image frame has been cropped in S31 of FIG. 9, the so-cropped image is preferably positioned into the new image frame according to the method disclosed in FIG. 3 or 4. Thus, the method continues to step S1 of FIG. 3 or step S10 of FIG. 4, where a re-positioning is performed.

As is illustrated in FIG. 11C, this cropping will adjust the size of the original image frame 10 so that it can be positioned according to the present invention into the new image frame 30 in such a way that all four image edges 12, 14, 16, 18 are aligned with block boundaries 32, 34 of the new image frame.

It is anticipated by the present invention that the cropping action can be performed on the portion of the original image frame close to one or both vertical sides (as in FIG. 11B), on the portion of the frame close to one or both horizontal sides or on the portion of the frame close to one or both horizontal sides and one or both vertical sides.

Thus, the original image frame to be positioned in the new image frame according to the present invention (and disclosed in FIGS. 3 and 4) can be an uncropped image frame, an uncropped image frame that is temporarily positioned in order to determine a surplus or cropping portion or a cropped image frame. In addition, the image frame may have been resized or not resized prior the positioning and optional cropping. In other words, the positioning of the present invention can be applied to any form of image regardless of the prior processing performed on the image.

FIG. 10 is a flow diagram illustrating an additional step in the cropping procedure part of the present invention. The method continues from step S30 of FIG. 9. In a next step S40, the size of the identified surplus portion is determined and compared to a threshold value. If this surplus portion is too large, i.e. has a size larger than the threshold, an unacceptably large amount of image elements of the original image frame has to be removed in order to the cropping to become effective, i.e. to enable alignment of all image edges with block boundaries. Thus, in this case too much image data would have to be cut away and cropping is therefore not performed and the method ends. This means that typically only three edges of the original image frame can be aligned with block boundaries (see FIGS. 6C, 8 and 11A). If, however, the surplus portion is relatively small, i.e. its size being smaller than the threshold, cropping can be performed without a too large loss of image data. The method then continues to step S31 of FIG. 9, where the cropping is performed. In this case typically all four edges of the original image frame will be aligned with block boundaries and no bleeding will occur.

The threshold employed in step S40 could state the maximum number of image elements that the surplus portion may contain in order to allow cropping. Alternatively, the threshold could indicate the maximum length of extension beyond the column or row boundary. For example, assume that an image block of FIG. 11A contains 8×8 image elements. In such a case, the threshold could state that if the surplus portion extends up to four image elements into the image blocks cropping should be performed. This principle can also be applied when comparing the size of the surplus portion to the corresponding size of a column (or row) of image blocks that the surplus portion partially covers. A ratio therebetween will then be larger than 0 (if equal to zero the edge is actually aligned with a block boundary) but smaller than 1 (if equal to one the edge is actually aligned with a block boundary). The threshold could then be any maximum allowed ratio between 0 and 1.

Note that if the original image frame already fits between block boundaries of the new image frame, no cropping has to be performed and the steps of FIGS. 9 and 10 are omitted.

In the foregoing, an edge or row/column boundary of the original image frame has been aligned with a straight boundary of at least one image block in the new image frame. This principle can be extended to alignment of two edges, one edge and one row/column boundary or one row boundary and one column boundary. In FIG. 12, no resizing of the original image frame 10 has been performed before the positioning. This means that in this case, the original image frame 10 will not extend over the whole height or width of the new image frame 30. As a consequence, borders of image elements of the new image frame 30 will be found all around the original image frame 10, if not positioned at a corner or side of the new image 30.

In this example, a first straight boundary 46A and a second straight boundary 46B of at least one image element 40 are identified in the new image frame 30. Furthermore, the second straight boundary 46B is perpendicular to the first straight boundary 46A. For example, the first straight boundary 46A could be a boundary of a block column or a portion thereof. In such a case, the second straight boundary 46B will be a boundary of a block row or a portion thereof. In a first embodiment, a first edge 16 of the original image 10 is aligned with the first straight boundary 46A and a second perpendicular edge 12 or the image 10 is aligned with the second straight boundary 46B. In a second embodiment, an inner row or column boundary is aligned with one of the first 46A and second 46B straight boundary, whereas a first edge 16 of the original image 10 perpendicular to the inner row or column boundary is then aligned with the other of the first 46A and second 46B straight boundary. This alignment is further performed so that a second edge 12 of the original image 10 parallel to the inner row or column boundary becomes aligned with a row or column boundary in the new image frame 30. In a third embodiment, an inner row boundary of the original image frame 10 is aligned with the first straight boundary 46A (or second straight boundary 46B) and an inner column boundary is aligned with the second straight boundary 46B (or first straight boundary 46A). These alignments are further performed in such a manner that a first 16 and second 12 edge of the original image frame 10 parallel with the inner column and row boundary, respectively, becomes aligned with block boundaries in the new image frame 30.

As is illustrated in FIG. 12 by performing such a procedure at worst two edges of the original image frame 10 will not be aligned with block boundaries and any bleeding is limited to these two edges. Positioning the original image 10 in the new image 30 according to prior art teachings, i.e. as central and symmetrical as possible, would result in four non-aligned edges and bleeding at all the image edges during encoding.

FIG. 13 is a flow diagram illustrating a transcoding method according to the present invention in which an original image having an original image format is transcoded into a new image having a different image format. The method starts in step S50, where the original image frame is decoded, if provided as an encoded image. In a next step S51, the new image frame having the new image format is provided. The decoded original image frame is then positioned into the new image frame in step S52. This step S52 is performed according to any of the embodiments described in the foregoing, e.g. in connection with FIG. 3 or 4. The so obtained new image frame with the original image positioned therein is then encoded in step S53. The method then ends. This transcoding procedure is, for example, applicable during widescreen format adaptation and other image resizing operations.

The steps S50 to S53 can be performed once on a single image. Alternatively, if several images are to be transcoded, e.g. a stream of images, such as video stream, the steps S50 to S53 are preferably performed for each image frame that should be resized.

FIG. 14 is a block diagram of a frame processor 100 according to the present invention. The frame processor 100 optionally includes an input and output (I/O) unit 110 for conducting communication with external units and terminals. This I/O unit 110 is preferably configured for received image data to be processed by the frame processor 100 and for outputting image data processed by the processor 100. A boundary identifier 120 is implemented in the frame processor 100 for identifying a straight boundary of at least one image block in a new image frame, into which another image (original image frame) is to be positioned. The two relevant image frames can be provided from a frame memory 140 arranged in or associated with the frame processor 100. Alternatively, at least one of the image frames can be provided by the I/O unit 110 from an external unit or terminal. Furthermore, the frame processor 100 can itself include functionality and units for generating the original and/or new image frame.

The straight boundary identified can be a boundary of a row or column of image blocks in the new image frame, or a portion of such a block row or column. The straight boundary could be an outermost block boundary, i.e. an image edge or boundary, or a portion thereof in the new image frame. In a preferred implementation, the straight boundary is however an inner row or block boundary, or a portion thereof, and not an image edge.

A frame aligner 130 is then operated, in a first embodiment, for aligning a first edge of the original image frame with the straight boundary identified by the boundary identifier 120. In a second embodiment, the aligner 130 aligns a row or column boundary in the original image frame with the straight boundary so that a first edge of the original image frame parallel with the row or column boundary becomes aligned with a row or column boundary in the new image frame.

In both these operation embodiments, the result is the same, i.e. an edge of the original image frame becomes aligned with and coincidence with a row or column boundary of the new image frame. As a consequence, no bleeding will occur during a subsequent encoding for this image edge and the edge can also be encoded with few bits compared to a non-aligned edge.

The frame aligner 130 is preferably configured for furthermore aligning a second and third edge of original image frame with a second and third image edge of the new image frame. Alternatively, the frame aligner 130 could be configured for also aligning the second and third edge of the original image with a second and third row or column boundary in the new image frame. This means that at least three edges of the original image frame will be aligned with block boundaries in the new image frame. Note that the second and third edges are preferably parallel edges and are furthermore preferably perpendicular to the first edge.

The boundary identifier 120 is preferably adapted for identifying a straight boundary in the new image frame that allows the frame aligner 130 to centre the original image as symmetrical as possible in the new image frame.

The resulting processed image frame can then be, at least temporarily, stored in the frame memory 140, forwarded to an application or graphic system in the frame processor or sent to some external unit via the I/O unit 110.

The frame processor 100 may optionally include a frame resizer 150 that operates on the original image frame and resizes the image before the frame aligner 130 aligns the resized image. This resizing unit 150 is preferably adapted for resizing the original image frame while keeping the aspect ratio (height-to-width ratio) of the image.

An optional cropping unit 160 is implemented in the frame processor 100 for cropping or cutting a surplus portion of (possibly resized) original image frames in order to allow all four edges of the original image frame to be aligned with block boundaries in the new image frame.

An optional color processor 170 is provided for assigning color representations to the border portion of the new image frame, i.e. to the image elements positioned outside of the original image in the new image frame. This color processor 170 is preferably also configured for identifying colors of image elements in the original image frame. The frame aligner 130 can then use this information in order to determine which edge of the original image frame to align with the straight boundary identified by the boundary identifier 120.

The units 110, 120, 130, 140, 160 and 170 of the frame processor 100 may be provided as software, hardware or a combination thereof. The units 110 to 170 may be implemented together in the frame processor 100. Alternatively, a distributed implementation is also possible with some of the units provided elsewhere in a transcoder, user terminal, e.g. mobile terminal or computer, or network node.

FIG. 15 is a block diagram of an embodiment of the cropping unit 160 of FIG. 14. This cropping unit 160 includes a portion identifier 162 for identifying a surplus portion of the original image frame not being aligned with and extending beyond a row or column boundary in the new image frame. This portion identifier 162 is preferably operated on the temporary arrangement with the original image frame positioned by the frame aligner into the new image frame. An optional size comparator 164 compares the size of this identified surplus portion with a threshold value. If the size exceeds the threshold, no cropping should be performed since too much image data would then have to be removed from the original image, leading to reduced image quality. If the size is smaller than the threshold, the size comparator 164 generates a cropping command that is forwarded to a frame cropper 166 of the cropping unit 160.

The frame cropper 166 crops the original image frame, preferably based on a cropping command from the size comparator 164. This cropping action can be performed on the surplus portion identified by the portion identifier 162. However, the frame cropper 166 preferably crops the original image frame as symmetrical as possible e.g. by removing half the surplus portion from one image side and removing half the surplus portion from the opposite image side. As a result of the operation of the frame cropper 166, all four sizes of the original image frame can be aligned with block boundaries when the frame aligner re-positions the original image in the new image.

The units 162 to 166 of the cropping unit 160 may be provided as software, hardware or a combination thereof. The units 162 to 166 may be implemented together in the cropping unit 160. Alternatively, a distributed implementation is also possible with some of the units provided elsewhere in the frame processor.

FIG. 16 is a block diagram of an embodiment of the color processor 170 of the frame processor in FIG. 14. The color processor 170 includes a color assigner 172 for assigning color representations to the image elements in the new image frame being outside of the original image frame, i.e. to the border image elements. This color representation is preferably a one-color representation, e.g. black.

A color identifier 174 is implemented in the color processor 170 for investigating the colors of the image elements close to the sides of the original image frame. This color identifier 174 then identifies the side of the original image having image elements with color representations that are closest to the color representation assigned by the assigner 172 to the border image elements. This information is forwarded to the frame aligner of the frame processor. The aligner uses this information and aligns the edge of the original image frame opposite to the side identified by the color identifier 174 with the straight boundary. This minimizes the bleeding since the non-aligned surplus portion is closest, form color point of view, to the border color.

The units 172 and 174 of the color processor 170 may be provided as software, hardware or a combination thereof. The units 172 and 174 may be implemented together in the color processor 170. Alternatively, a distributed implementation is also possible with some of the units provided elsewhere in the frame processor.

FIG. 17 is block diagram of a transcoder 200 according to the present invention. The transcoder 200 comprises and I/O unit 210 for communicating with external units. This I/O unit 210 is in particular configured for receiving image data from external unit and for transmitting transcoded image data. The transcoder 200 includes a decoder 220 for decoding any image data that is encoded. This encoded image data can be provided from the I/O unit 210 or from a memory 250 in the transcoder 200. The decoded image (or uncoded image) has a first image format and is to be transcoded by the transcoder 200 into another image format, e.g. for widescreen formation adaptation.

A frame provider 230 provides a new image frame that has the desired target image format. This provider 230 can provide the new image frame from the memory 250, where e.g. image frames with different standard formats are stored. Alternatively, the provider 230 can obtain the new image format externally, possibly via the I/O unit 210. The image format to use could be pre-defined or the frame provider 230 receives information thereof. The original image from the decoder 220, the I/O unit 210 or the memory 250 and the new image frame from the frame provider 230 are brought to a frame processor 100 for positioning the original image in the new image frame. This frame processor 100 corresponds to the processor disclosed above and illustrated in FIG. 14 and is not further described. The resulting new image frame with the original image positioned therein according to the invention is then optionally provided to an encoder 240. This encoder 240 encodes the image data, which then can be stored in the memory 250 or sent to an external unit via the I/O unit 210. Due to the alignment of the original image in the positioning, the bleeding artifact is reduced or totally suppressed during the encoding. In addition, the encoder 240 needs fewer bits to represent the edges of the original image that are aligned with block boundaries in the new image frame.

The transcoder 200 could operate on single images and/or on a stream of multiple images, e.g. a video stream.

The units 100, 210 to 230 of the transcoder 200 may be provided as software, hardware or a combination thereof. The units 100, 210 to 250 may be implemented together in the transcoder 200. Alternatively, a distributed implementation is also possible with some of the units provided elsewhere in a user terminal or network node or some other terminal/unit in which the transcoder 200 implemented.

FIG. 18 illustrates a user terminal 1 represented by a mobile unit. However, the invention is not limited to mobile units by could be implemented in other terminals and data processing units, including other thin clients and computers. Only means and elements in the mobile unit 1 directly involved in the present invention are illustrated in the figure.

The mobile unit 1 comprises a graphic system 3 for managing image and graphic data. In particular, the graphic system 3 is adapted for rendering or displaying images on a connected screen 4 or other display unit. The mobile unit 1 also comprises a storage or memory 5 for storing data therein. In this memory 5 image data may be stored, in particular encoded image data.

A transcoder 200 according to the present invention is implemented in the mobile unit 1 for transcoding an image having a first format into an image having a second format before e.g. the image is rendered or display on the screen 4 by the graphic system 3. This transcoder 200 has been described and disclosed above in connection with FIG. 17.

The image data to transcode can be provided from the storage 5 or received by an I/O unit 2 from some external mobile unit, network node or service provider. The transcoding and positioning of image data according to the present invention is typically required when the image data is received from a unit that employs a certain image format, whereas the mobile unit 1 (or more precisely the graphic system and screen 4 of the mobile unit 1) is adapted for another image format.

The transcoded image may, thus, be stored in the storage 5 or rendered on the display screen 4. Alternatively, or in addition, the transcoded image data could be wirelessly transmitted to an external unit or terminal. Alternatively, other techniques for distributing images could be employed, such as IR-techniques using IR ports and wired transferring of image data between terminals. Also memory cards or chips that can be connected and exchanged between terminals could be used for this image data inter-terminal distribution.

The units 2, 3 and 200 of the mobile unit 1 may be provided as software, hardware or a combination thereof.

FIG. 19 schematically illustrates a portion of a wireless communications system employing a transcoder 200 according to the present invention. This transcoder 200 can be implemented in a network node of the system, e.g. in a base station 6A, 6B or some other network node in the radio access network 9 or the core network portion of the communications system. In FIG. 19, the transcoder 200 is implemented, in an exemplary manner, in connection with a multimedia messaging service center (MMSC) 7 that is used by the communications system for processing multimedia messages transmitted throughout the system. For example, a first mobile unit 1A generates a first image that has a format and size adapted for this particular mobile type. This image is then transmitted to a second mobile unit 1B of another terminal type. Thus, the image is transmitted, e.g. in the form of a multimedia messaging service (MMS) message, by the first mobile unit 1A to its connected base station 6A. The base station 6A forwards the MMS message to the MMSC 7 provided in the network 9. This MMSC 7 investigates the format of the image in the MMS message and determines whether the receiving mobile unit 1B supports this image format. If the mobile unit 1B does not support the format, the image or the whole MMS message is provided to the connected transcoder 200 (which, alternatively can be implemented in the MMSC 7). The transcoder 200 then transcodes the image into the new format by employing the present invention. The transcoded image is included in the MMS message that is forwarded to a base station 6B, to which the receiving mobile unit 1B is connected. The base station 6B send the MMS message to the mobile unit 1B that can render and display the included image.

As has been evident from the discussion in the foregoing, the frame processor and transcoder of the present invention can be implemented in a user terminal, e.g. a computer or mobile unit or other thin client. Alternatively, or in addition, the frame processor and transcoder of the invention can be implemented in a network node of a wireless communications system, e.g. in a base station, or in or connected to a multimedia processor.

It will be understood by a person skilled in the art that various modifications and changes may be made to the present invention without departure from the scope thereof, which is defined by the appended claims.

The invention claimed is:

1. A method of positioning contents of an original image frame into a new image frame of multiple image blocks, said method comprises the steps of:
   using a processor, resizing said original image frame while keeping an aspect ratio of said original image frame;
   using the processor, identifying a straight boundary of at least one image block in said new image frame;
   using the processor, aligning a first edge of said original image frame with said identified straight boundary to so position corresponding contents of said original image frame into said new image frame;
   using the processor, aligning a second edge of said original image frame with a second edge of said new image frame;
   using the processor, aligning a third opposite edge of said original image frame with a third opposite edge of said new image frame;
   using the processor, identifying a surplus portion of said original image frame not being aligned with and extending beyond a boundary of a row or column of image blocks in said new image frame;
   using the processor, comparing a size of said identified surplus portion with a minimum threshold; and
   using the processor, cropping said original image frame so that a formed edge of said original image frame aligns with a boundary of a row or column of image blocks in said new image frame if said size is smaller than said minimum threshold.

2. A method of positioning contents of an original image frame of multiple image blocks into a new image frame of multiple image blocks, said method comprises the steps of:
   using a processor, identifying a straight boundary of at least one image block in said new image frame; and
   using the processor, aligning a boundary of a row or column of image blocks in said original image frame with said identified straight boundary so that a first edge of corresponding contents of said original image frame parallel with said boundary of a row or column of image blocks in said original image frame is aligned with a boundary of a row or column of image blocks in said new image frame.

3. The method according to claim 1, further comprising the steps of:
   using the processor, identifying a surplus portion of said original image frame not being aligned with and extending beyond a boundary of a row or column of image blocks in said new image frame; and
   using the processor, cropping said original image frame so that a formed edge of said original image frame aligns with a boundary of a row or column of image blocks in said new image frame.

4. The method according to claim 3, wherein said cropping step comprises
   using the processor, cropping a first portion of said original image frame in connection with a first side of said original image frame and
   using the processor, cropping a second portion of said original image frame in connection with a second opposite side of said original image frame, where a total size of said first portion and said second portion being equal to said surplus portion.

5. The method according to claim 1, further comprising the step of, using the processor, assigning a color representation to image elements in said new image frame that are outside of said original image frame.

6. The method according to claim 5, wherein said aligning step comprises the steps of:
   using the processor, identifying a side of said original image frame having image elements with color representations being closest to said color representation; and
   using the processor, aligning an edge of said original image frame opposite to said identified side with said identified straight boundary.

7. The method according to claim 1, wherein said identifying step comprises the step of, using the processor, identifying a straight boundary of at least one image block in said new image frame that allows centering said original image frame as symmetrical as possible in said new image frame.

8. A method of transcoding an original image frame having an original image format into a new image frame having a new image format, said method comprises the steps of:
   using a processor, decoding said original image frame;
   using the processor, providing said new image frame;
   using the processor, resizing said original image frame while keeping an aspect ration of said original image frame;
   using the processor, identifying a straight boundary of at least one image block in said new image frame;
   using the processor, aligning a first edge of said original image frame with said identified straight boundary to so position corresponding contents of said original image frame into said new image frame;

using the processor, aligning a second edge of said original image frame with a second edge of said new image frame;

using the processor, aligning a third opposite edge of said original image frame with a third opposite edge of said new image frame;

using the processor, identifying a surplus portion of said original image frame not being aligned with and extending beyond a boundary of a row or column of image blocks in said new image frame;

using the processor, comparing a size of said identified surplus portion with a minimum threshold;

using the processor, cropping said original image frame so that a formed edge of said original image frame aligns with a boundary of a row or column of image blocks in said new image frame if said size is smaller than said minimum threshold; and using the processor, encoding said new image frame.

9. A system of positioning contents of an original image frame into a new image frame of multiple image blocks, said system comprises:

means for resizinq said original image frame while keeping an aspect ratio of said original image frame;

means for identifying a straight boundary of at least one image block in said new image frame; and means for aligning a first edge of said original image frame with said straight boundary identified by said identifying means to so position corresponding contents of said original image frame into said new image frame;

means for aligning a second edge of said original image frame with a second edge of said new image frame;

means for aligning a third opposite edge of said original image frame with a third opposite edge of said new image frame;

means for identifying a surplus portion of said original image frame not being aligned with and extending beyond a boundary of a row or column of image blocks in said new image frame;

means for comparing a size of said identified surplus portion with a minimum threshold; and means for cropping said original image frame so that a formed edge of said original image frame aligns with a boundary of a row or column of image blocks in said new image frame if said size is smaller than said minimum threshold.

10. A system of positioning contents of an original image frame of multiple image blocks into a new image frame of multiple image blocks, said system comprises:

means for resizing said original image frame while keeping an aspect ratio of said original image frame;

means for identifying a straight boundary of at least one image block in said new image frame;

means for aligning a boundary of a row or column of image blocks in said original image frame with said identified straight boundary identified by said identifying means so that a first edge of corresponding contents of said original image frame parallel with said boundary of a row or column of image blocks in said original image frame is aligned with a boundary of a row or column of image blocks in said new image frame;

means for aligning a second edge of said original image frame with a second edge of said new image frame;

means for aligning a third opposite edge of said original image frame with a third opposite edge of said new image frame;

means for identifying a surplus portion of said original image frame not being aligned with and extending beyond a boundary of a row or column of image blocks in said new image frame;

means for comparing a size of said identified surplus portion with a minimum threshold; and means for cropping said original image frame so that a formed edge of said original image frame aligns with a boundary of a row or column of image blocks in said new image frame if said size is smaller than said minimum threshold.

11. The system according to claim 9, further comprising:

means for identifying a surplus portion of said original image frame not being aligned with and extending beyond a boundary of a row or column of image blocks in said new image frame; and means for cropping said original image frame so that a formed edge of said original image frame aligns with a boundary of a row or column of image blocks in said new image frame.

12. The system according to claim 11, wherein said cropping means is configured for cropping a first portion of said original image frame in connection with a first side of said original image frame and cropping a second portion of said original image frame in connection with a second opposite side of said original image frame, where a total size of said first portion and said second portion being equal to said surplus portion.

13. The system according to claim 9, further comprising means for assigning a color representation to image elements in said new image frame that are outside of said original image frame.

14. The system according to claim 13, further comprising means for identifying a side of said original image frame having image elements with color representations being closest to said color representation, wherein said aligning means is configured for aligning an edge of said original image frame opposite to said side with said straight boundary.

15. The system according to claim 9, wherein said identifying means is configured for identifying a straight boundary of at least one image block in said new image frame that allows centering said original image frame as symmetrical as possible in said new image frame.

16. A transcoder for transcoding an original image frame having an original image format into a new image frame having a new image format, said transcoder comprises:

decoder for decoding said original image frame;

means for providing said new image frame;

a system for positioning contents of said decoded original image frame into said new image frame, said system comprising:

means for resizing said original image frame while keeping an aspect ratio of said original image frame;

means for identifying a straight boundary of at least one image block in said new image frame;

means for aligning a first edge of said original image frame with said straight boundary identified by said identifying means to so position corresponding contents of said original image frame into said new image frame;

means for aligning a second edge of said original image frame with a second edge of said new image frame;

means for aligning a third opposite edge of said original image frame with a third opposite edge of said new image frame;

means for identifying a surplus portion of said original image frame not being aligned with and extending beyond a boundary of a row or column of image blocks in said new image frame;

means for comparing a size of said identified surplus portion with a minimum threshold; and means for cropping said original image frame so that a formed edge of said original image frame aligns with a boundary of a row or column of image blocks in said new image frame if said size is smaller than said minimum threshold; and encoder for encoding said new image frame.

17. A user terminal comprising a transcoder according to claim 16.

18. A network node comprising a transcoder according to claim 16.

* * * * *